Figure 6:
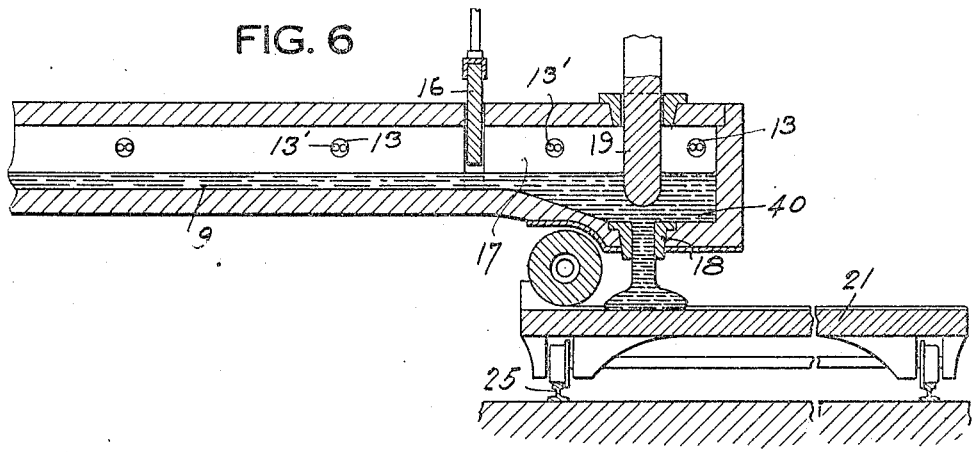

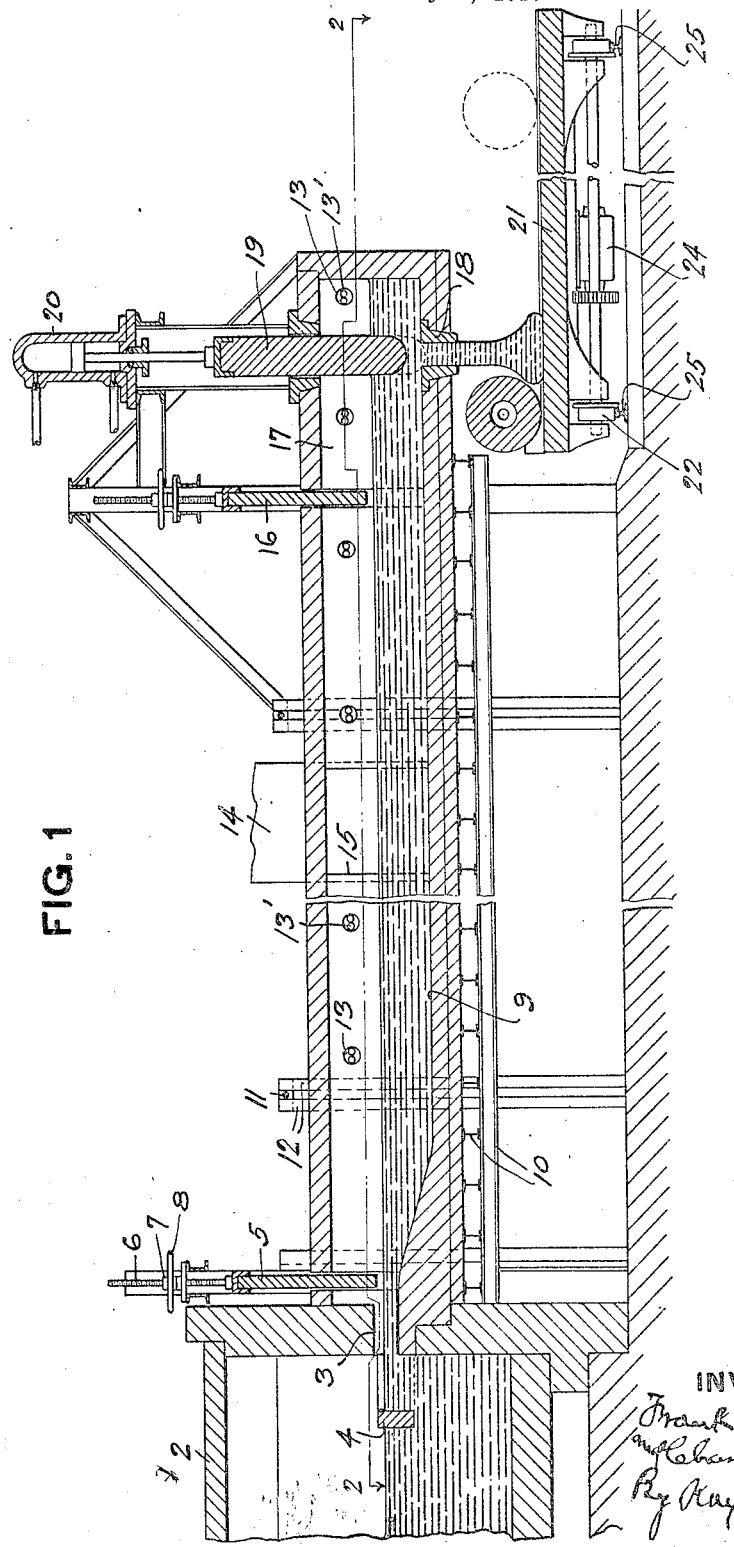

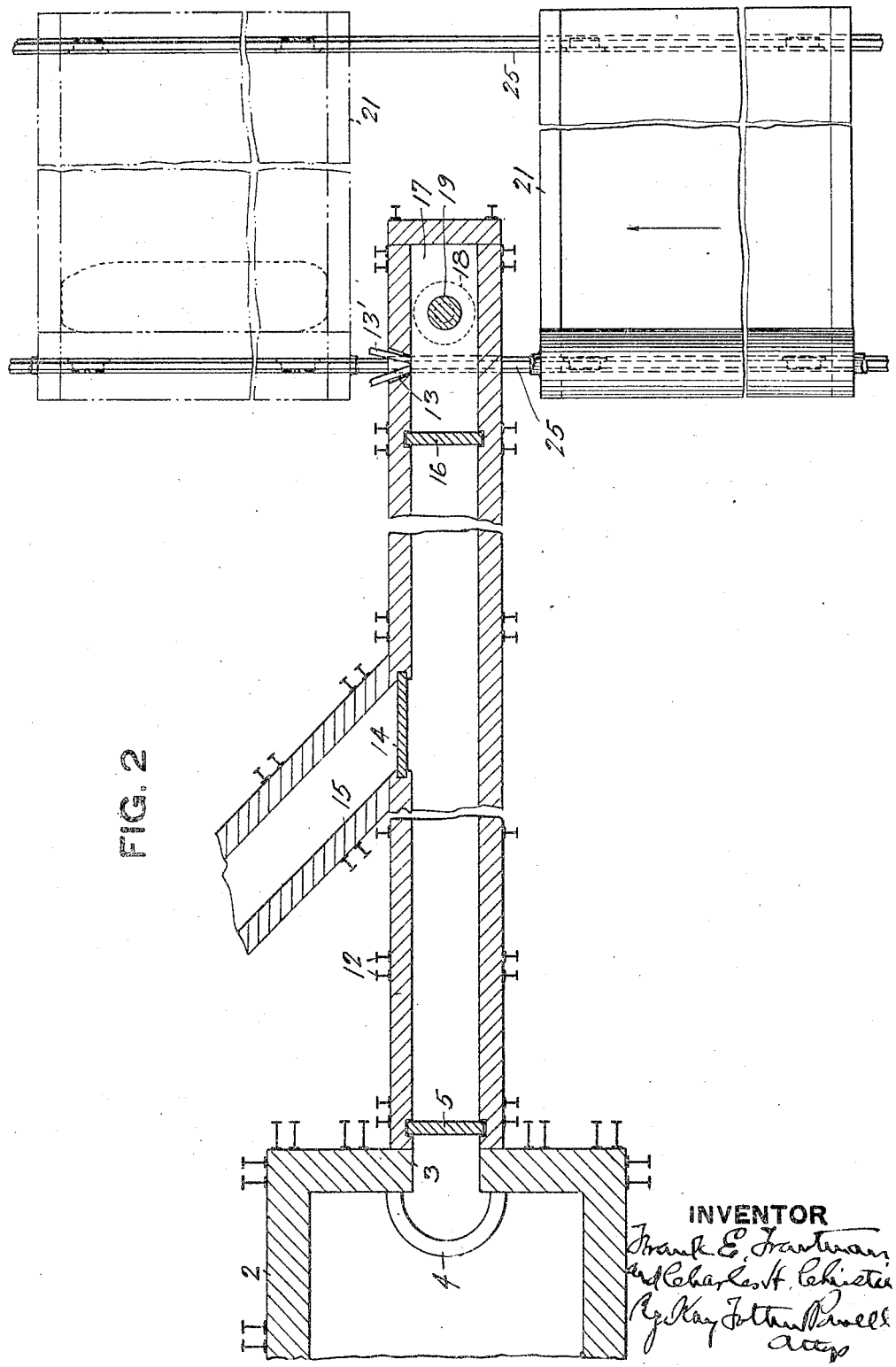

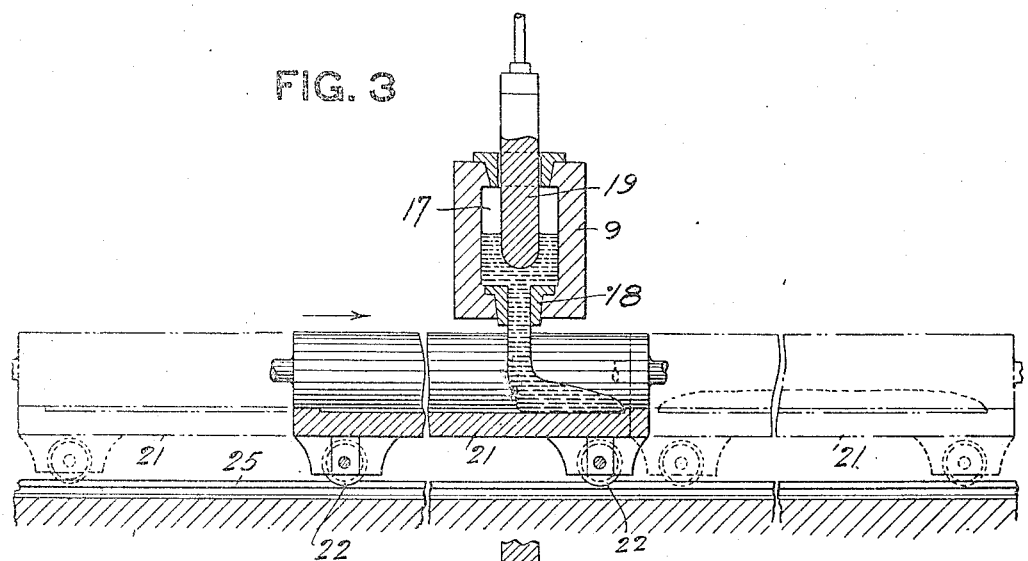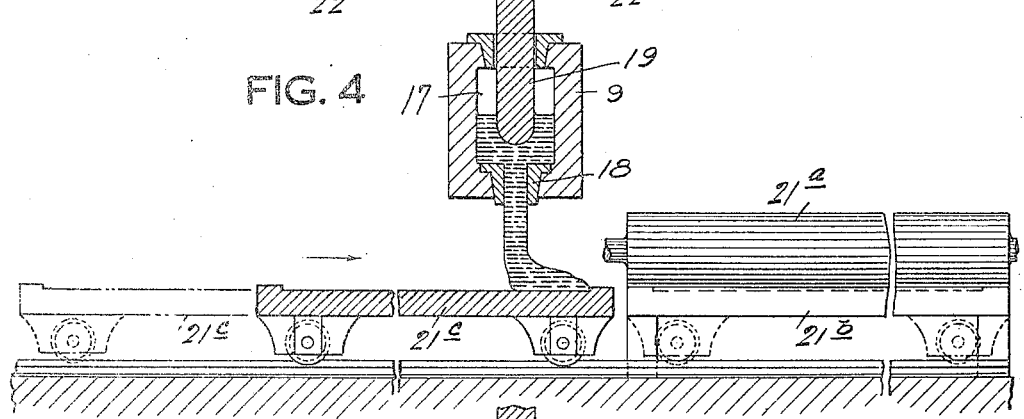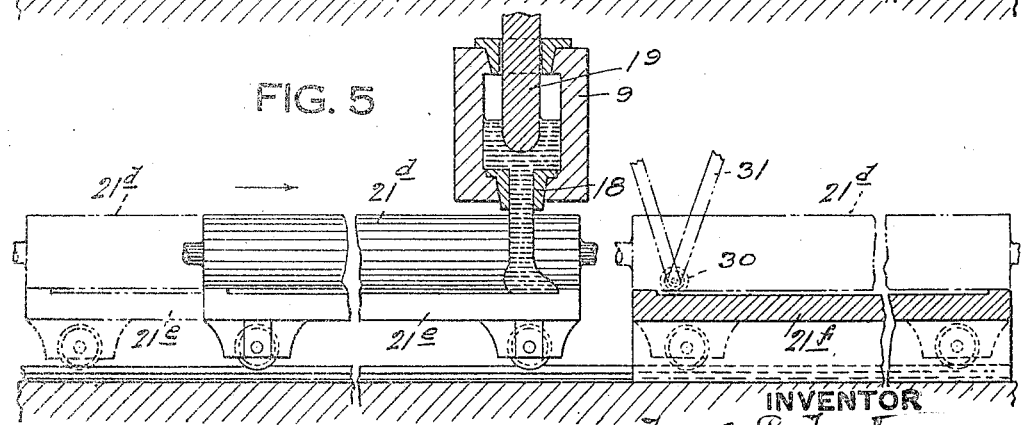

Patented Apr. 21, 1925.

1,535,062

UNITED STATES PATENT OFFICE.

FRANK E. TROUTMAN AND CHARLES H. CHRISTIE, OF BUTLER, PENNSYLVANIA.

APPARATUS FOR MAKING PLATE GLASS.

Application filed May 7, 1919. Serial No. 295,486.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Apparatus for Making Plate Glass; and we do hereby declare the following to be a full, clear, and exact description thereof.

Our invention relates to improvements in apparatus for making rolled or plate glass.

The main object of the invention is to provide apparatus by use of which the glass can be manufactured cheaper and better. These objects are attained by first melting the glass batch in a tank furnace, which is by nature the most economical and efficient way of making glass, and then transferring the molten glass from the furnace to the casting table, where it is rolled flat, without impairing the quality of the metal. It is well known that the quality of the molten metal deteriorates with handling or disturbing its body.

At the present time the better quality flat or rolled glass is melted in clay pots in furnaces and after the glass is melted the whole furnace is cooled to reduce the temperature of the glass to a suitable working temperature. Then the pots are taken out of the furnace and carried to the casting table where the pots are emptied on the table for rolling to a flat plate. These pots are then returned to the furnace until all have been emptied and the process of melting is again resumed. The cost of these pots is excessive and the handling; and pot furnaces are by no means efficient. Much batch material is also wasted in this operation in the boiling over of the pots and the spillage in filling the pots. Some glasses of poorer quality are produced by melting in a tank furnace and removing the glass from the tank, by means of a ladle to the casting table. However, this ladling process agitates the body of the molten glass in the tank furnace resulting in a poor quality of glass. The glass in these furnaces must also be cooled preparatory to ladling to reduce the temperature of the glass sufficiently for casting. The melting temperature of the glass is relatively much hotter than the working temperature.

The use of our apparatus provides for transferring the molten glass from the tank furnace to the casting table in a body, thus eliminating the use of pots or ladles of any kind. It also provides for taking the glass from the tank in a practically continuous stream, thus permitting the furnace to operate under most favorable conditions to produce the highest quality of glass continuously. However, this continuous operation is not essential to the working of our apparatus.

The temperature of the glass at the finishing end is essentially very high during its operation of melting, so we have provided means for cooling the glass to a suitable working temperature during the process of transfer to the casting table. During the process of transfer the body of the metal is not agitated in any way and hence its quality not affected. Our apparatus also provides means by which all the plates can be made uniform in size and yet of different thickness if so desired, all of which are free from the defects which have their origin in dumping from a pot or dipping with a ladle. The reduction of the labor in the handling of the batch materials and also in the handling of the glass is apparent. The fuel saving is also very great. Attention is directed to our copending application, Serial No. 295,485, filed May 7th, 1919, directed to a process to which the apparatus herein described is particularly applicable.

Fig. 1 is a longitudinal sectional elevation; Fig. 2 is a horizontal sectional view on the line 2—2 Fig. 1; Fig. 3 is a cross-section at the front end of the runway showing the glass being discharged onto the casting table; and Figs. 4, 5, 6, 7 and 8 show modified forms of our invention.

A tank furnace of the usual construction and design, common in the art, is used to melt the glass batch and attached to the end of this tank furnace and adjacent the position of the finished glass in the furnace 2 (the end of which only is shown) is the runway 9, which is connected to the furnace at the discharge opening 3 in the side of the furnace 2. A floater 4 is shown in the furnace located directly in front of the discharge opening 3. This floater is of the usual type and construction and is common in the art. Its function is to prevent the objects on the surface of the glass from passing into the runway 9. The molten glass from the furnace flows by gravity through the discharge opening in the furnace, into the runway 9 and this flow may be stopped if desired by means of the gate valve 5 which is a block of refractory clay fitted neatly to the passage in the runway. The valve 5 is raised and lowered by means of the screw 6 and the nut 7, being operated by the hand wheel 8.

The runway is constructed of fire clay blocks such as are used in the construction of the furnace, fitted together and supported on structural steel work 10 and held in place by means of buck-stays 12 and tie-rods 11. This runway 9 is constructed of sufficient length and thickness so as to permit the molten metal therein which leaves the furnace at a high temperature to cool sufficiently, by natural radiation or by forced ventilation of the runway through the openings 13 in its side walls or roof, to leave the metal at a suitable working temperature. Should the metal become too cool, owing to changing weather conditions, the glass may be heated to the desired temperature by means of the gas burners 13' located in the openings 13 in the runway, the same place where the cool air pipes are located. The fact that we can accurately control the temperature of the glass in the runway is of great value in securing good and uniform results.

There is provided a gate valve 14 and by-pass 15 similarly constructed to 5 and 9, respectively, for connecting more than one melting furnace to the one runway. This is to provide for maintaining the supply of glass should the melting furnace 2 need repair.

Adjacent the delivery end of the runway 9 there is provided a gate 16 similar to and controlled in the same manner as gate 5. This gate will permit the glass being shut off from the delivery end for repairs to the delivery end 17 when necessary. This delivery end 17 is provided with a valve 19 which is raised and lowered by means of the air cylinder 20. This valve 19 seats on a relatively small fire-clay valve seat 18 which is therefore easily renewable.

Figure 7:
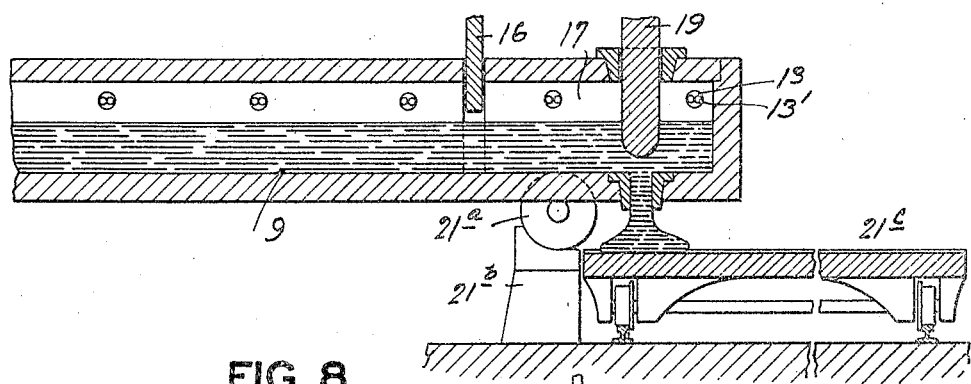

In the construction shown in Figs. 4 and 7 the roller 21ª is mounted on a stationary stand 21ᵇ. In this case the table 21ᶜ receives the glass and moves over in line with the roller mounted on the stationary stand so that the roller can pass from the stationary stand onto the table to perform the rolling operation.

Figure 8:
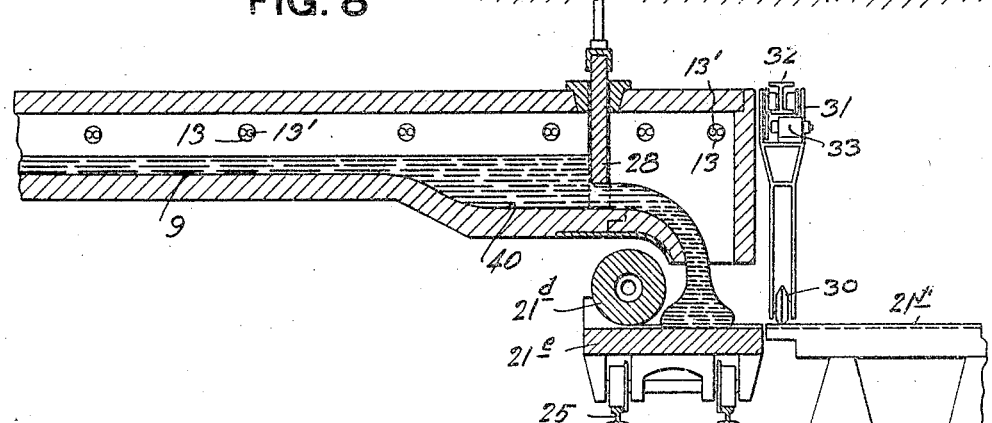

In Figs. 5 and 8 the roller 21ᵈ is mounted on the short table 21ᵉ traveling on the tracks transversely of the runway, and the main table 21ᶠ is stationary. In this case the glass is deposited on the short table 21ᵉ and that table is then moved over into line with the stationary table 21ᶠ whereupon the glass is then rolled on both the short table 21ᵉ and on the stationary table 21ᶠ. It will be apparent, however, that in this construction it will be necessary to have the cutting wheel 30 carried by the trolley 31 and driven by the motor 33, said trolley traveling on the track 32. In this way provision is made for cutting off that portion of glass on the short table 21ᵉ which would be of inferior quality.

Figs. 6 and 8 also show a different form of runway, the runways in the above instances having the auxiliary pockets or reservoirs 40 at the discharge end giving a greater depth of glass at the delivery end than in the runway itself. This construction allows the glass to flow constantly from the furnace through the runway, accumulating in the reservoir and awaiting discharge onto the table.

In Fig. 8 a different form of valve 28 is employed to control the delivery of the glass onto the table, said valve being in the form of a gate valve.

The molten glass in the tank furnace 2 at its very high finishing temperature is permitted to flow by gravity from the furnace 2 through the outlet 3 and the gate valve 5 into the runway 9 until the runway is filled through its length.

This glass is radiating its heat all the time in passing through the runway either by forced or natural means, until it arrives at the delivery end of the runway. If for any reason the glass has become too cold it may be reheated in the runway by means of the burners 13'. So in any case we have the glass arriving at the delivery end of the runway at a proper temperature for working. The casting table meanwhile has been moved to its position, on the opposite side of the delivery end to the position of rolling, then the valve 19 in the delivery end 17 is opened and the glass is permitted to flow out onto the floor until a desired stream has been established. When the stream of glass is correct the table 21 is moved on the tracks 25 by means of the motor 24 and the wheels 22 so that the stream of glass is deposited on the table in the position determined. After the table has passed through the stream, the valve 19 is closed and the glass which dribbled onto the floor in the opening and closing of the valve is returned to the furnace for remelting.

The table having meanwhile arrived at the position before the leer oven or kiln the roller is drawn across the table in the usual manner forming the flat plate, which in turn is pushed off the table in the usual manner into the leer oven or kiln for annealing. The roller and table are then returned to their original positions to receive another charge of glass and the whole operation repeated as fast as the leer or kiln can take care of the plates. This in practice varies from 6 to 10 minutes. It is readily apparent that by varying the speed of the table in passing through the stream of glass any desired amount of glass can be deposited on the table. This allows any thickness of plates to be made on the table but all of them can be made the same size. The advantage of this will be apparent to those versed in the art.

The same results can be obtained by the different methods as shown in the drawings accompanying this description, the only difference being in the fact that in the different drawings the roller in one case is not carried on the movable table and in the other case only a small section of the table is movable. In fact in the latter case the movable portion is not essentially a table but a carrier to convey the glass in an undisturbed body to the table. The glass which remains on this device is then cut off the body of the plate by means of the cutter 30 and returned to the furnace for remelting. This is, of course, not essential but is done in order to secure the most perfect plates possible.

By having the casting table much larger than the size of the plate for which the annealing ovens are designed, we could roll a plate larger and by using a cutter like 30 at each end of the plate, we could have each and every plate that enters the annealing ovens exactly the same size. Advantages of this are obvious.

What we claim is:—

1. In apparatus for making plate or flat glass, the combination with a casting table of a melting furnace, a shallow runway of materially greater length than width communicating with said furnace, said runway having a delivery pocket at the outer end, and means for controlling the discharge of the glass from the bottom of said delivery pocket.

2. In apparatus for making plate or flat glass, the combination with a casting table of a melting furnace, a shallow runway of materially greater length than width communicating with said furnace and adapted to receive the glass from said furnace continuously, said runway having a delivery pocket adapted to receive the glass from said runway continuously, and means for discharging the glass from said delivery pocket intermittently.

3. In apparatus for making plate or flat glass, the combination of a melting furnace, a shallow runway of materially greater length than width communicating with said furnace having a delivery pocket at its outer end, a casting table, and means for delivering the glass from said delivery pocket to said table intermittently.

4. In apparatus for making plate or flat glass, the combination with a casting table of a melting furnace, a shallow runway of materially greater length than width communicating with said furnace, a delivery pocket at the outer end of said runway, means for independently controlling the temperature of the glass in said runway, means for independently controlling the temperature of the glass in said delivery pocket, and means for discharging the glass from the delivery pocket.

5. Apparatus for casting molten glass comprising a reservoir having a glass capacity materially greater than the quantity of glass discharged during a single casting operation, the said reservoir having a downwardly opening glass outlet, a table adapted to move beneath the said glass outlet, and a roll for forming the glass on said table into a sheet.

6. In apparatus for making flat glass, the combination of a melting furnace, a shallow runway of materially greater length than width communicating with said furnace, means independent of said furnace for controlling the temperature of the glass at the outer end of said runway, a receptacle adapted to receive glass from the outer end of said runway and having a discharge opening in its bottom, a casting table adapted to move beneath said opening, and means for forming the glass on said table into a sheet.

In testimony whereof, we, the said FRANK E. TROUTMAN and CHARLES H. CHRISTIE, have hereunto set our hands.

FRANK E. TROUTMAN.
CHARLES H. CHRISTIE.

Witnesses:
  THEODORE C. H. KECK.
  C. E. FLACK.